July 28, 1959
M. N. AITKEN
2,896,668
ORIFICE FITTING
Filed May 18, 1955
2 Sheets-Sheet 1
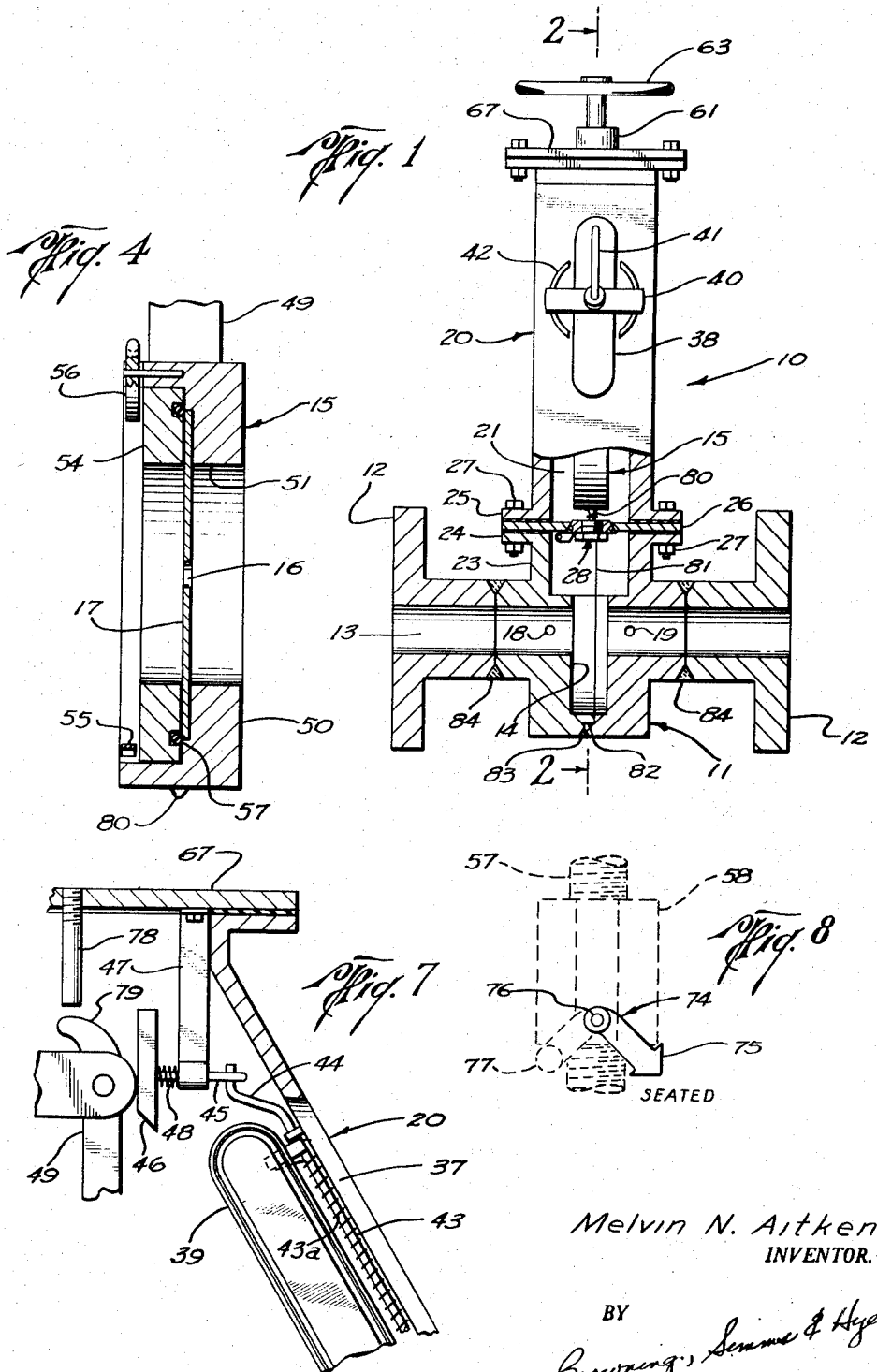
Melvin N. Aitken
INVENTOR.
BY
Browning, Semmes & Hyer
ATTORNEYS

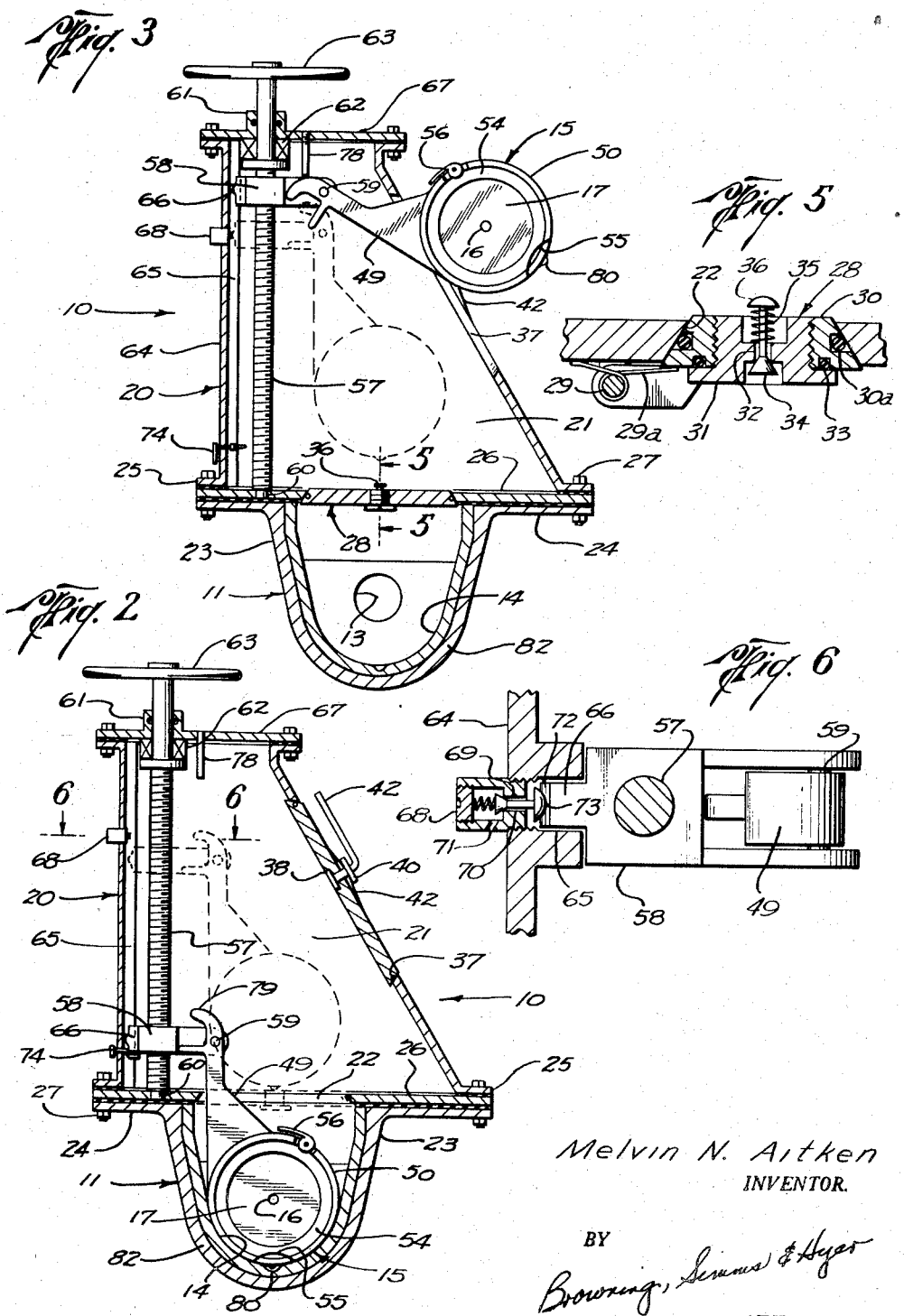

United States Patent Office 2,896,668
Patented July 28, 1959

2,896,668

ORIFICE FITTING

Melvin N. Aitken, Houston, Tex.

Application May 18, 1955, Serial No. 509,249

20 Claims. (Cl. 138—44)

This invention relates to that type of apparatus known as an orifice fitting by means of which an orifice plate may be disposed across a pipeline for measuring the amount of fluid flow therethrough, and then removed from the line for the purpose of inspection, repair, or replacement.

If the orifice plate is to be inserted within and removed from a dead line, the fitting need only comprise a body having a flow passage therethrough connectable in the line and a lateral opening through which the orifice plate may be passed. However, the plate and its carrier must be seatable across the flow passage in a manner to prevent flow therepast except through the orifice opening. Furthermore, accurate measurements are attainable only if the flow passage is smooth at each side of the seat for the carrier.

The fitting is of a considerably more complex nature if the plate is to be inserted and removed without shutdown of the line. In such a case, it has been the practice of the prior art to provide a fitting having a housing laterally of the body forming a chamber intermediate the flow passage and exterior of the line and connected with the flow passage in a manner to permit the orifice plate carrier to be moved between a position within the housing and a position across the flow passage. In the former position, the chamber may be sealed off from the flow passage and housing exterior or selectively communicated with one or the other of the flow passage and housing for the purpose of pressure equalization.

Thus, when it is desired to remove the carrier from the line for inspecting, repairing, or replacing the orifice plate, the carrier is moved through the connection to its position within the housing and the chamber is sealed off. The pressure within the chamber is then vented to the exterior of the housing and an outlet from the housing is opened to permit access to the carrier. The carrier is inserted within the line by first closing the outlet to again seal off the chamber and then communicating the chamber and flow passage to equalize the pressure therebetween. The carrier may at this time be moved through the connection to its position across the flow passage.

In the fittings of the prior art, it has been the practice to provide a plurality of controls for performing the above-described steps. Thus, for example, with a typical orifice fitting it may be necessary to manipulate one device for moving the carrier, another device for opening and closing a valve for the connection between the chamber and flow passage, still another device for opening and closing a closure for the outlet from the housing, and still further devices for venting the chamber and equalizing the pressure across the valve. Not only are these operations time-consuming, but also they result in a complicated structure which requires the services of a skilled workman to insure that each operation is performed in its proper sequence.

An object of this invention is to provide an orifice fitting in which many, and preferably all, of these operations may be performed by manipulation of only a single actuating device.

Another object is to provide an orifice fitting in which one or more of the afore-mentioned controls are automatically operable in response to actuation of the means for moving the carrier between its positions within the housing and across the flow passage.

Still another object is to provide an orifice fitting having the automatic controls of the character described in the foregoing object which are operable in response to actuation of a handwheel or other rotatable device in only one directional sense during insertion or removal of the carrier.

A further object is to provide an orifice fitting in which the chamber thereof is automatically vented upon movement of the carrier into the housing to a position which permits closing of the connection between the housing and flow passage.

A still further object is to provide an orifice fitting in which the closure for the housing outlet is automatically opened upon movement of the carrier into the housing to a position which permits closing of the connection and venting of the chamber.

A still further object is to provide an orifice fitting in which the chamber thereof is first automatically vented and the closure for the housing outlet then automatically opened upon movement of the carrier into the housing to a position which permits closing of the connection.

Still a further object is to provide an orifice fitting in which a valve for the connection between the chamber and flow passage is automatically opened in response to engagement therewith of the carrier in moving from a position within the housing to a position across the flow passage.

Yet another object is to provide an orifice fitting wherein the pressure across the valve is automatically equalized upon movement of the carrier toward its position across the flow passage to permit said valve to be opened and the carrier passed through the connection.

A still further object is to provide a body for an orifice fitting which is so constructed as to facilitate formation of the carrier seat therein as well as assembly of the fitting in the pipeline.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is an elevational view, partly in section, from a direction transversely of the flow through an orifice fitting constructed in accordance with this invention, and showing the orifice plate carrier in a position within the fitting housing;

Fig. 2 is a cross-sectional view of the fitting of Fig. 1, taken substantially along broken line 2—2 of Fig. 1, but showing the orifice plate carrier in a seated position across the flow pasage through the fitting body;

Fig. 3 is a view similar to Fig. 2, but in which the orifice plate carrier has been swung outwardly from a position within the housing through an outlet therefrom;

Fig. 4 is an enlarged detailed sectional view of the orifice plate carrier;

Fig. 5 is an enlarged cross-sectional view, taken substantially along broken line 5—5 of Fig. 3, of a portion of the valve for the connection between the flow passage and housing;

Fig. 6 is an enlarged sectional view, taken substantially along broken line 6—6 of Fig. 2, of the means of venting the chamber;

Fig. 7 is a sectional view of a part of a modified form of fitting in which means are provided for automatically opening a closure for the housing outlet; and Fig. 8 is an enlarged detailed view of an exteriorly visible signaling device for indicating seating of the carrier across the body flow passage.

The orifice fitting of the present invention comprises a body having a flow passage theerthrough, a housing forming a chamber disposed laterally of the body, and an opening connecting the flow passage to the chamber. The fitting further includes a carrier for the orifice plate and means for moving the carrier between a position across the flow passage and a position within the chamber. As well known in the art, when the carrier is disposed across the flow pasage, the amount of flow through the line may be calculated by observation of the pressures immediately upstream and downstream of the orifice plate. When the carrier is disposed within the housing, on the other hand, the valve may be closed and the closure for the housing outlet moved to an open position to permit access to the carrier.

In accordance with certain novel concepts of the present invention, the means for venting the chamber is responsive to actuation of the carrier moving means subsequent to movement of the carrier into the housing whereby the valve may be closed. More particularly, such venting means is opened by a part positioned to be engaged by the carrier moving means. Further, the means for opening the closure for the housing outlet may be made similarly responsive to actuation of the carrier moving means subsequent to movement of the carrier into the chamber. However, these parts of the venting means and closure opening means are so located relative to one another that movement of the carrier means is automatically operative to first vent the chamber and then open the closure. The housing may be provided further with a part positioned for engagement with the carrier during such movement for swinging the same through the outlet about a pivotal connection with the carrier moving means subsequent to opening of the outlet closure.

In accordance with other novel aspects of the present invention, the valve for the housing opening is automatically opened upon engagement therewith of the carrier during movement of said carrier from its position within the housing to its position across the flow passage. Also, the means for equalizing the pressure across the valve is responsive to actuation of the carrier moving means prior to movement of such carrier through the opening from a position within the housing to a position across the flow passage so that the pressure thereacross is first equalized to permit opening of such valve. In the particular embodiment shown in the drawings, this latter equalizing means is disposed in the valve such that it is also actuated upon engagement therewith of the carrier.

The body of the orifice fitting is connectable in a pipeline and has a flow pasage therethrough for register with the pipeline flow passage. In accordance with this invention, the forming of a seat within the body for the orifice plate carrier is fiacilitated by the fabrication of the body in two parts. To be more specific, the body is split into two parts substantially transversely of the flow passage axis and intermediate the seat so that such seat may be machined in a much simpler manner than is possible in the case of the integrally cast body of prior art fittings. Furthermore, such body parts are provided with interfitting and complementary stepped end faces which not only aid in aligning such parts during welding thereof, but also prevent the formation on the carrier seat of a welding bead.

Referring now particularly to the drawings, there is shown in each of Figs. 1 to 3 an orifice fitting 10 adapted to be disposed in a pipeline (not shown). This fitting includes a body 11 having flanges 12 at its opposite ends for securement to flanged open ends of the pipeline, and a flow passage 13 therethrough adapted to register with the flow passage through the pipeline. Disposed substantially intermediate the opposite ends of the body is a seat 14 in which an orifice plate carrier 15 is adapted to be seated, as shown in Fig. 2, in a position across the flow passage.

When the carrier 15 is so seated, the flow of fluid through the fitting is confined to passage through a restricted opening 16 in orifice plate 17 mounted in the carrier 15. That is, as will be explained more fully hereinafter, the seat 14 is recessed and the carrier is caused to seat in sealed relation to the downstream face of the seat 14. Tapped openings 18 and 19 are provided laterally through the wall of the body 11 immediately upstream and downstream, respectively, of seat 14 to receive manometers such that the pressure drop across the orifice plate may be measured for calculating the flow through the line.

A housing 20 is mounted on the body 11 and provides a chamber 21 therein disposed laterally of the flow passage 13 and connected therewith through an opening 22 in the end of housing 20 mounted upon the body. More particularly, the body is provided with an upstanding portion 23 which defines an opening connecting with the body flow passage and adapted to communicate with the opening 22 from the housing when the housing is mounted upon and secured to the body. As can be seen from the drawings, the upstanding portion 23 of the body is provided with a flanged surface 24 to which a flanged surface 25 on the afore-mentioned end of the housing and a plate 26 across said end are secured by bolts 27. As indicated in the drawings, these members are sealed vapor-tight by gaskets or other suitable means.

A valve 28 is pivotally mounted about shaft 29 to one side of opening 22 and urged to closed position by a spring element 29a. As can be seen from Figs. 1 to 3, the opening through upstanding portion 23 of the body is of sufficient height and so shaped as to permit said valve to be moved to an open position and carrier 15 passed through the opening 22, as shown in Fig. 2. The valve is of substantially elongate construction and comprises an outer seating part 30 which carries an O-ring 30a for sealing engagement with the tapered seat through opening 22, as best shown in Fig. 5, and a central part 31 having a bypass 32 therethrough. The part 31 is threadedly connected within the seating part 30 in sealed relation thereto by means of O-ring 33 carried within a groove upon the underside of part 30. Disposed within the bypass 32 is a check valve 34 which is urged by a coil spring 35 to the closed position shown in Fig. 5, but which is adapted to be opened by the depression of a head 36 disposed above the upper level of valve 28.

An outlet 37 from the housing is provided through a lateral wall thereof, as shown in Figs. 2, 3, and 7, to permit access to the carrier 15 when in a position within the housing or, if desired, to permit said carrier to be swung outwardly of the housing. This outlet 37 may be closed by a manually operable closure 38 (Figs. 1 and 2) which has been removed in Fig. 3 to permit access through outlet 37 to the carrier. Preferably, however, the outlet is adapted to be closed by a closure 39 which may be opened automatically in response to actuation of the carrier moving means, and which will be described more fully hereinafter in connection with Fig. 7.

As can be seen from Fig. 2, the manually operable closure 38 is of substantially elongate construction similarly to valve 28 for accommodating the passage therethrough of carrier 15, and is provided with suitable sealing means about its periphery for engagement with the tapered seat about outlet 37. The closure 38 may be locked in closed position by any suitable means such as the lever 40 rotatable by handle 41 into the position shown in Fig. 1 over cams 42 on the outer lateral wall of the housing so as to compress the sealing means of the closure into tight sealing engagement with the outlet 37, as shown in Fig. 2. It will be appreciated that the closure may be removed so as to open the outlet by rotating the handle 41 approximately 90 degrees from its position shown in Figs. 1 and 2 and then tilting the closure slightly away from the outlet 37 to permit its withdrawal therethrough.

The automatically operable closure 39 is mounted on a shaft 43 for pivotal movement about one side of the housing outlet 37, similarly to the manner in which valve 28 is mounted about one side of opening 22, and urged to a closed position by a spring element 43a. The closure 39 is adapted to be swung to the open position of Fig. 7 by means of crank arm 44 on the end of shaft 43 and connected by rod 45 to a cam 46. The rod 45 is loosely received within a support 47 carried from the upper end of the housing 20 and is surrounded by a coil spring 48 disposed between the support and cam for urging the crank arm 44 to a position closing the closure 39. However, in a manner to be explained more fully hereinafter, the means for moving the orifice plate carrier 15 is movable into the position shown in Fig. 7 for engaging cam 46 to open the closure.

The carrier 15 includes an arm 49 from which is supported a cylindrical holder 50. As shown in Fig. 4, the holder 50 is provided with an opening 51 therethrough and is recessed upon its upstream side for receiving the orifice plate 17. The plate 17 is held in position by a circular retainer 54 having an opening therethrough for alignment with holder opening 51 when the retainer is received in the holder recess, as shown, and maintained in such position by a spring 55 and a pivotally swingable cam 56. An O-ring 57 is received within a groove of the retainer 54 in a position overlying the intersection of the periphery of orifice plate 17 and the recessed portion of holder 50 in which the plate is received so as to prevent the flow of fluid within the pipeline beyond the orifice plate except through the opening 16 for metering same. The pivotal connection of cam 56 permits the retainer 54 to be removed and the orifice plate easily and readily replaced.

The means for moving the carrier 15 through opening 22 between a position within the housing and a position across the flow passage includes a screw 57 rotatably mounted within the housing to one side of opening 22 along an axis substantially transverse to the axis of the flow passage, and a nut 58 threadedly but non-rotatably received on the screw 57 and pivotally supporting the carrier arm 49 between its bifurcated end by means of pin 59. The lower end of the screw 57 is provided with a stub shaft 60 rotatably mounted in the lower end of the housing, and the upper portion thereof is journaled in the upper end of the housing as at 61 and surrounded by suitable packing 62 for providing a vapor-tight seal. The screw is manually rotatable from the exterior of the housing by means of a handwheel 63 or other actuating device at the upper end of the screw.

The side wall 64 of the housing adjacent the screw is provided with a vertical slot 65, and a tongue or projection 66 provided on the side of nut 58 opposite the pin 59 is guidably received for vertical movement in the slot so that rotation of the screw causes the nut, and thus the carrier 15, to be moved longitudinally with respect to the axis of the screw.

The upper end 67 of the housing is removably secured to flanged portions of side wall 64 and the opposite lateral wall through which the housing outlet 37 is provided. As can be seen from Figs. 2 and 3, the packing gland 62 and portion 61 of the housing for journaling the upper end of screw 57 are disposed in this removable upper end 67 thereof so as to permit their repair and replacement. The afore-mentioned lateral wall is preferably angularly disposed to the side wall 64 and forms an acute angle with the bottom end of the housing so as to facilitate the swinging of carrier 15 outwardly of the housing. On the other hand, this lateral wall should be sufficiently removed from the path of the carrier 15 within the housing so as to permit either the manual or automatic opening of the outlet closure prior to having access to the carrier.

Disposed through a wall of the housing is a means for selectively venting the pressure within the chamber 21 to the exterior of the housing. As shown in Fig. 6, this venting means comprises a rather conventional check valve 68 threadedly received in an opening through wall 64 and having a valve member 69 spring-pressed into a position for closing an opening 70 through the valve which is adapted to communicate the interior of the housing or chamber 21 with the exterior thereof by means of lateral port 71 through the valve body. As can be seen from Fig. 6, a button or raised portion 72 on the tongue 66 of nut 58 is adapted to engage a head 73 upon valve member 69 so as to move same to an open position during movement of the nut 58 within the slot 65.

Also disposed through wall 64 of the housing for engagement by the nut 58, but more nearly adjacent the flow passage than the venting means, is a means 74 for indicating when the carrier 15 has reached the seated position of Fig. 2 across the flow passage. As shown in Fig. 8, this indicating means comprises an arrow 75 disposed exteriorly of the housing and mounted upon a rotatable shaft 76 sealably extended through the side wall 64. A crank arm 77 is mounted on the interior end of the shaft in position to be engaged by the nut 58 in its lowermost position, as shown in phantom in Fig. 8. As is obvious from the drawings, in this latter position, at which time the carrier 15 is seated across the flow passage, the arrow 75 is swung by means of crank arm 77 to a position pointed to the word "seated" on the outside of the housing. Upon raising of the nut and removal of the carrier from its seated position, the indicating means 74 may be returned to its original position (not shown) manually or by any suitable automatic device.

Depending from the upper end 67 of the housing is a pin 78 positioned for engagement with the upper cammed end 79 of carrier arm 49 so as to swing the arm and carrier 15 in a counterclockwise direction, as viewed in Figs. 2, 3, and 7, about the pin 59 and outwardly of the housing through outlet 37, as previously described.

Describing now the operation of the above-described orifice fitting and assuming outlet 37 to be closed, it can be seen that in moving from its seated position of Fig. 2 across the flow passage 13 to a position within the housing, such as shown in phantom in Fig. 3, the nut 58 is adapted to engage the head 73 of the venting means 68 so as to vent the pressure within chamber 21. However, as can be seen from the phantom lines of Fig. 2, the part 72 of the nut will not thus actuate the venting means until the carrier has reached a position which permits closing of the valve 28. Due to the fact that this valve is spring-pressed toward closed position, the chamber 21 will be automatically sealed off upon raising of the carrier to the afore-mentioned position shown in phantom in Fig. 2. Further movement upwardly of the carrier 15 to a position permitting easy access thereto (see phantom lines of Fig. 3) will result in actuation of the means 68 such that the pressure within the sealed off chamber 21 is vented.

Such venting of the chamber enables opening of the closure for the housing outlet 37 and insures the vapor-tight sealing of valve 28. As previously mentioned, the closure 38 may be manually operable upon reaching of the carrier to the afore-mentioned accessible position. However, it is preferred that the automatic closure 39 be provided, as described in connection with Fig. 7. For this purpose, the cam 46 is positioned so as to be engaged by the bifurcated end of the nut 58 subsequent to actuation of the venting means 68. Thus, upon venting of the chamber 21, the cam 46 is engaged by the nut 58 upon further upward movement thereof to cause the crank arm 44 to swing closure 39 to an open position. Further actuation of the carrier moving means and consequent raising of the carrier arm 49 will bring the cammed upper end 79 of the arm into engagement with pin 78 so as to swing the carrier 15 outwardly of the housing through outlet 37 in a manner previously described. Of course, the cam 46 and pin 78 are so positioned relative to one another as to insure opening of the closure 39 prior to swinging of the carrier through the opening. Also, the cam 46 is so shaped as to maintain the closure open during swinging of the carrier.

It is apparent that the use of the pin 78 and cammed upper end 79 of carrier 49 will be preferred in many instances inasmuch as it permits greater accessibility to the carrier during inspecting, repairing, or replacing the orifice plate 52. On the other hand, it will be understood from the foregoing description that access to the orifice plate in the carrier 15 may be had through the outlet 37 without necessarily swinging such carrier outwardly of the housing.

However, assuming the carrier 15 has been swung outwardly of the housing and it is desired to insert it across the flow passage, a reversal of the rotation of handwheel 63 for screw 57 will cause the nut 58 to be moved downwardly such that the arm 49 will be disengaged from pin 78 and swing clockwise to an upright position as shown in phantom in Fig. 3. Further actuation of the carrier moving means and downward movement of the carrier will cause the screw 57 to be disengaged from the cam 46 so that the crank arm 44 is urged by spring 48 to a position for closing the closure 39, such urging being supplemented by the spring 43a. Further actuation of the carrier moving means will cause the nut 58 to be moved past the venting means 68 into a position as illustrated by the phantom lines of Fig. 2 wherein the chamber 21 is sealed off.

Upon continued downward movement of the carrier, a projection 80 on the lower end thereof will engage the head 36 of the check valve member 35 so as to move the valve to a position opening bypass 32 so that the pressure across valve 28 is equalized or at least lessened. Still further downward movement of the carrier 15 will bring such carrier into engagement with the face of valve 28 and swing it about its shaft 29 to an open position, thereby enabling such carrier to move through opening 22 into the fitting body. Actuation of the carrier moving means is continued until its lower end rests upon the seat 14, as best shown in Fig. 2. During this last portion of carrier movement, the nut 58 engages and swings crank arm 77 in a manner to move arrow 75 into a position pointing toward the word "seated" to indicate to an observer outside of the fitting that the carrier is fully seated. Such an indicating means will avoid forcing of the carrier into the seat and damage to the means for moving same.

From the foregoing it is obvious that each of the operations or steps necessary in either inserting or removing the orifice plate carrier is automatically operable in response to actuation of a single device in the form of the carrier moving means. More particularly, the orifice plate carrier may be inserted by the continuous rotation of handwheel 63 in one directional sense, while the removal of the orifice plate carrier is enabled merely by continuous rotation of the handwheel in an opposite directional sense. In this respect, "continuous" has reference to the fact that it is not necessary to reverse the direction of turning during insertion or removal, and not to the fact that the handwheel necessarily must be turned without stopping. Such a mode of operation requires a minimum of effort and attention by the operator and is obviously of the type which may be performed by an unskilled workman. Also, this operation of the fitting avoids the human element of error in performing any one of the above steps in its improper sequence.

Returning now to a more detailed description of the body 11 of the fitting, it can be seen from Fig. 1 that the body is split along line 81 (Fig. 1) into two parts substantially transversely of the axis of flow passage 13 and intermediate the recessed seat 14. More particularly, one of the parts of the body has a stepped end face adapted to interfit with a complementarily stepped end face of the other part so as to provide in effect an overlapping peripheral portion 82 which extends about the body exteriorly of the inside line of contact therebetween. By means of the separate body parts, the seat 14 may be formed by lathes rather than the more expensive milling machines which would be required if the seat were to be formed out of an integral body casting. In other words, the finely machined surfaces of the seat 14 which enable a sealed engagement therewith of the carrier 15 are provided by forming the recessed portion of each part of the seat separately from the other.

When the body parts are assembled so as to form the composite body, the overlapping portion 82 about the periphery of the body defined by the stepped end faces above-described prevents any of the welding material 83 for joining said two parts together from seeping into the seat 14, so that it is not necessary to remove welding beads from the seat 14 subsequent to the joinder of the two body parts. These stepped end faces also facilitate the aligning of the two body parts preparatory to their being welded together, such alignment being an essential part of the assembly of the body inasmuch as the seat 14 must be smooth along its lower surface.

The opposite ends of the body parts may be provided with the flanges 12 shown in Fig. 1 for connection with the open ends of the pipeline when assembly is in the field. However, it is sometimes the practice to assemble the fitting upon branch lines or "meter runs" at the factory or place of manufacture of the fitting. For this latter purpose, each body part may be divided into an inner portion in which seat 14 is formed and an outer portion for carrying the flange 12. In this manner, if the fitting is to be assembled in the line in the field, as above-mentioned, the flanged portions may be welded at 84 to the seat portions for bolting the ends of the body to flanged open ends of the pipeline.

However, if the fitting is to be assembled in a "meter run," it is common practice to dispense with the flanges and butt weld the ends of the fitting to the opposite open ends of the meter run. According to the present invention, the formation of the body in two separate parts will enable any welding beads which may form on the inside joint between the fitting and "meter run" within the flow passage to be removed prior to joining of such parts together. That is, each of the inner portions of the split parts of the body may be separately joined to an open end of the meter run and any welding beads upon such connections removed prior to the joinder of such parts together as at 83.

As mentioned in an earlier part of the specification, when the orifice plate is to be inserted or removed from a dead line, a housing forming a chamber laterally of the body is normally not employed. In such a case, the flanged upper end 24 of body portion 23 is merely sealed off by a blind flange (not shown) after insertion of the carrier across the flow passage. Thus, removal of the blind flange permits removal of the carrier. It will be understood that the above-described novel body construction may be employed with a fitting of the type for use in a dead line as well as with a fitting requiring a housing 20.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An orifice fitting, comprising a body having a flow passage therethrough, a chamber disposed laterally of the body, an opening connecting the flow passage and chamber, an orifice plate carrier, means for moving the carrier through said opening between a position across the flow passage and a position within the chamber, an exit from the chamber through which the orifice plate may be passed, valve means for closing the opening when the carrier has been moved into the chamber, means for venting the chamber, and means automatically responsive to actuation of the carrier moving means for opening the venting means subsequent to movement of the carrier into the chamber.

2. An orifice fitting, comprising a body having a flow passage therethrough, a chamber disposed laterally of the body, an opening connecting the flow passage and chamber, an orifice plate carrier, means for moving the carrier through said opening between a position across the flow passage and a position within the chamber, an exit from the chamber through which the orifice plate may be passed, valve means for closing the opening when the carrier has been moved into the chamber, a vent port from the chamber, a valve member for opening and closing said vent port, and means connected to said valve member and engageable by said carrier moving means for moving said valve member to the vent opening position subsequent to movement of the carrier into the chamber.

3. An orifice fitting, comprising a body having a flow passage therethrough, a chamber disposed laterally of the body, an opening connecting the flow passage and chamber, an orifice plate carrier, means for moving the carrier through said opening between a position across the flow passage and a position within the chamber, an exit from the chamber through which the orifice plate may be passed, value means automatically operable to close said opening upon movement of the carrier into the chamber, means for venting the chamber, and means automatically responsive to actuation of the carrier moving means for opening the venting means subsequent to closing of said opening.

4. An orifice fitting, comprising a body having a flow passage therethrough, a chamber disposed laterally of the body, an opening connecting the flow passage and chamber, an orifice plate carrier, means for moving the carrier through said opening between a position across the flow passage and a position within the chamber, valve means for closing said opening when the carrier has been moved into said chamber, means for venting the chamber when said opening has been closed, an outlet from the chamber to permit access to the carrier when in the chamber, a door for closing said outlet, and means responsive to actuation of the carrier moving means subsequent to movement of the carrier into the chamber for opening the door.

5. An orifice fitting of the character defined in claim 4, wherein said door opening means comprises a part positioned in the chamber for engagement by said carrier moving means upon said actuation thereof.

6. An orifice fitting of the character defined in claim 4, wherein said carrier is swingably connected to the moving means therefor, and a part is positioned in the chamber to be engaged by the carrier for swinging said carrier out said outlet in response to actuation of the carrier moving means subsequent to opening of the door.

7. An orifice fitting, comprising a body having a flow passage therethrough, a chamber disposed laterally of the body, an opening connecting the flow passage and chamber, an orifice plate carrier, means for moving the carrier through said opening between a position across the flow passage and a position within the chamber, valve means for closing said opening when the carrier has been moved into said chamber, means for venting the chamber when the opening is closed, an outlet from the chamber to permit access to the carrier, a door for closing the outlet, and means responsive to actuation of the carrier moving means subsequent to movement of the carrier into the chamber for first opening said venting means and then opening said door.

8. An orifice fitting, comprising a body having a flow passage therethrough, a chamber disposed laterally of the body, an opening connecting the flow passage and chamber, an orifice plate carrier, means for moving the carrier through said opening between a position across the flow passage and a position within the chamber, valve means for closing the opening when the carrier has been moved into the chamber, means for venting the chamber, an outlet from the chamber permitting access to said carrier, a door for closing the outlet, means for opening the door, a pivotal connection between said carrier and moving means therefor, each of said venting means and door opening means being responsive to actuation of said carrier moving means subsequent to movement of the carrier into the chamber to first vent the chamber and then open the door, and a part positioned in the chamber to engage said carrier and swing it about said pivotal connection and through the outlet subsequent to the venting of the chamber and opening of the door.

9. In an orifice fitting, a housing having one end adapted to be mounted on a body having a flow passage connectable in a pipeline, an opening through said end of the housing for communication with the flow passage, an orifice plate carrier, means for moving said carrier through the opening between a position within the housing and a position exteriorly thereof and across said flow passage, valve means for closing said opening to seal off the housing interior when the carrier is disposed therein, means urging the valve means to a closed position but adapted to be overcome by engagement of said carrier with the valve means during movement thereof from its position within the housing to its position exteriorly thereof, and means for communicating the housing interior with the body flow passage prior to engagement of the carrier with the valve means.

10. In an orifice fitting of the character defined in claim 9, wherein said communicating means includes a part responsive to actuation of said carrier moving means prior to movement of the carrier into engagement with the valve means for so communicating said housing interior and body flow passage.

11. In an orifice fitting of the character defined in claim 10, wherein said part is disposed in said valve means so as to be actuated to communicate said housing interior and body flow passage by engagement of the carrier.

12. In an orifice fitting, a housing having an opening through one end, an orifice plate carrier, means for moving said carrier through the opening between a position within the housing and a position exteriorly thereof, a valve seat surrounding the opening and a valve member seatable thereon for sealing off the housing interior, means hingedly connecting the valve member to said end of the housing for swinging movement to an open position outwardly of the housing upon engagement by the carrier during its movement from a position within the housing to a position exteriorly thereof, a normally closed check valve in said valve member, and a part on said check valve positioned to be engaged by said carrier for opening said check valve prior to engagement of the carrier with the valve member.

13. In an orifice fitting, a housing having one end adapted to be mounted on a body having a flow passage connectable in a pipeline, an opening through said end of the housing for communication with the flow passage, an orifice plate carrier, means for moving said carrier through the opening between a position within the housing and a position exteriorly thereof and across said flow passage, valve means for closing said opening to seal off the housing interior when the carrier is disposed therein, said valve means being automatically movable to an open position upon movement of the carrier from its position within the housing toward its position exteriorly thereof, means for communicating the housing interior with the body flow passage, and means automatically responsive to actuation of said carrier moving means for opening said communicating means prior to movement of said valve means to its open position.

14. In an orifice fitting of the character defined in claim 13, wherein said valve means is normally urged to its closed position and positioned for engagement by the carrier during its movement from its position within the housing to its position exteriorly thereof.

15. In an orifice fitting of the character defined in claim 13, wherein said automatically responsive means includes a part on the communicating means positioned for engagement by the carrier during its movement from its position within the housing to its position exteriorly thereof.

16. In an orifice fitting of the character defined in claim 13, wherein said valve means is normally urged to its closed position, and both of said valve means and a part on said automatically responsive means are positioned for engagement by the carrier during its movement from its position within the housing to its position exteriorly thereof.

17. In an orifice fitting, a housing having an opening through one end thereof, a screw rotatably mounted in the housing substantially prependicularly of said end, a nut non-rotatably mounted on the screw for movement lengthwise thereof in response to rotation of the screw, an orifice plate carrier supported by the nut for movement through the opening between a position within the housing and a position exteriorly thereof, an outlet from the housing having a closure movable to permit access to the carrier when in said position within the housing, a valve for closing the opening when the carrier is within the housing, and a valve for venting the pressure within the housing upon actuation of a part thereof disposed within the path of movement of the nut within the housing, said part being positioned relative to the opening as to be engaged and actuated by the nut during movement of the carrier toward its position within the housing subsequent to passage through the opening and disengaged to permit closing of the venting valve during movement of the carrier toward its position exterior of the housing prior to passage through the opening.

18. In an orifice fitting, a housing having an opening through one end thereof, a screw rotatably mounted in the housing substantially perpendicularly of said end, a nut non-rotatably mounted on the screw for movement lengthwise thereof in response to rotation of the screw, an orifice plate carrier supported by the nut for movement through the opening between a position within the housing and a position exteriorly thereof, a valve for closing the opening when the carrier is within the housing, an outlet from the housing having a closure movable to permit access to the carrier when in said position within the housing, means for moving the closure to said access permitting position upon actuation of a part thereof disposed within the path of movement of the nut within the housing, said part being so positioned relative to the opening as to be engaged and thereby actuated by the nut during movement of the carrier toward its position within the housing subsequent to passage through the opening and disengaged to permit said door to be closed during movement of the carrier toward its position exterior of the housing prior to passage through the opening.

19. An orifice fitting, comprising a body having a flow passage therethrough, a housing disposed laterally of the body, an opening connecting the flow passage and housing interior, a screw rotatably mounted within the housing, a nut non-rotatably mounted on the screw for movement lengthwise thereof in response to rotation of the screw, an orifice plate carrier supported by the nut for movement through the opening between a position within the housing and a seated position within the body across the flow passage, an outlet from the housing to permit access to the carrier when in the housing, a closure for said outlet, means for venting the housing, a valve for closing said opening, and means for equalizing the pressure across said valve, the closure and venting means each having a part engageable by the nut during movement of the carrier toward its position within the housing for first opening said venting means and then opening said closure, and the valve and equalizing means each having a part engageable by the carrier during movement of the carrier toward its position within the body for first equalizing the pressure across the valve and then opening the valve, said parts being so positioned relative to one another as to permit disengagement of the nut from the closure and venting means parts prior to engagement of the carrier with the equalizing means part during movement of the carrier toward its position within the body and to permit disengagement of the carrier from the valve and equalizing means parts prior to engagement of the nut with the venting means part during movement of the carrier toward its position within the housing.

20. An orifice fitting of the character defined in claim 19, wherein means are provided for indicating when said carrier has reached its seated position within the body, said indicating means including an indicator observable externally of the housing and a part within the housing positioned to be engaged by the nut when said carrier is seated for actuating said indicator.

References Cited in the file of this patent

UNITED STATES PATENTS

| | | |
|---|---|---|
| 1,996,192 | Daniels | Apr. 2, 1935 |
| 2,488,245 | Smith | Nov. 15, 1949 |
| 2,570,545 | Hamer | Oct. 9, 1951 |
| 2,688,987 | Whalen | Sept. 4, 1954 |